(12) United States Patent
Dunn et al.

(10) Patent No.: US 11,971,485 B2
(45) Date of Patent: Apr. 30, 2024

(54) METASURFACE ARRAY FOR LIDAR SYSTEMS

(71) Applicant: Analog Devices, Inc., Norwood, MA (US)

(72) Inventors: Tyler Adam Dunn, North Reading, MA (US); Andrew William Sparks, Arlington, MA (US)

(73) Assignee: Analog Devices, Inc., Norwood, MA (US)

( * ) Notice: Subject to any disclaimer, the term of this patent is extended or adjusted under 35 U.S.C. 154(b) by 1173 days.

(21) Appl. No.: 16/365,266

(22) Filed: Mar. 26, 2019

(65) Prior Publication Data

US 2019/0383943 A1 Dec. 19, 2019

Related U.S. Application Data

(60) Provisional application No. 62/687,105, filed on Jun. 19, 2018.

(51) Int. Cl.
| | |
|---|---|
| *G01S 7/486* | (2020.01) |
| *G01S 7/481* | (2006.01) |
| *G01S 7/4863* | (2020.01) |
| *G01S 17/10* | (2020.01) |
| *G01S 17/87* | (2020.01) |
| *G01S 17/88* | (2006.01) |
| *G02B 1/00* | (2006.01) |

(Continued)

(52) U.S. Cl.
CPC ............ *G01S 17/88* (2013.01); *G01S 7/4811* (2013.01); *G01S 7/4816* (2013.01); *G01S 7/4863* (2013.01); *G01S 17/10* (2013.01); *G01S 17/87* (2013.01); *G02B 1/002* (2013.01); *G02B 3/0037* (2013.01); *G02B 3/12* (2013.01)

(58) Field of Classification Search
CPC .... G01S 7/4816; G01S 7/4863; G01S 7/4811; G01S 17/88; G01S 17/87; G01S 17/10; G02B 3/12; G02B 3/0037; G02B 27/0916; G02B 27/0927; G02B 1/002; H01L 27/14625; H01L 31/02327; H01L 33/58
USPC ................................................. 356/601–623
See application file for complete search history.

(56) References Cited

U.S. PATENT DOCUMENTS 8,300,307 B2   10/2012  Tschekalinskij et al.
9,529,079 B1*  12/2016  Droz ........................ G01S 7/484
(Continued)

FOREIGN PATENT DOCUMENTS

CN    104792412 A    7/2015
EP     3379214 A1    9/2018
(Continued)

OTHER PUBLICATIONS

"U.S. Appl. No. 16/442,051, Final Office Action dated Oct. 5, 2022", 12 pgs.
(Continued)

*Primary Examiner* — Hoa Q Pham
(74) *Attorney, Agent, or Firm* — Schwegman Lundberg & Woessner, P.A.

(57) ABSTRACT

A lidar system and method includes a photodiode array, a wafer, and a plurality of structures integrated on the wafer to form a metasurface lens. The metasurface lens is configured to focus the light pulses to the photodiode array and each of the plurality of structures includes at least one dimension that is less than a wavelength of the light pulses.

13 Claims, 7 Drawing Sheets

(51) Int. Cl.
*G02B 3/00* (2006.01)
*G02B 3/12* (2006.01)

(56) References Cited

U.S. PATENT DOCUMENTS

| | | |
|---|---|---|
| 9,647,150 B2 | 5/2017 | Blasco Claret |
| 10,459,258 B2 * | 10/2019 | Baik .................. G06F 30/17 |
| 11,193,771 B1 | 12/2021 | Gregory et al. |
| 11,206,978 B2 * | 12/2021 | Hu .................. G02B 27/0172 |
| 2008/0212921 A1 | 9/2008 | Gaylord et al. |
| 2014/0263982 A1 | 9/2014 | Shkunov et al. |
| 2015/0219893 A1 | 8/2015 | Chen et al. |
| 2016/0282453 A1 | 9/2016 | Pennecot et al. |
| 2017/0350965 A1 | 12/2017 | Schmalenberg |
| 2018/0239021 A1 | 8/2018 | Akselrod et al. |
| 2019/0044003 A1 * | 2/2019 | Heck .................. G02B 1/002 |
| 2019/0064532 A1 * | 2/2019 | Riley, Jr. .............. H01S 5/4012 |
| 2019/0098233 A1 | 3/2019 | Gassend et al. |
| 2019/0129085 A1 | 5/2019 | Waldern et al. |
| 2019/0178714 A1 * | 6/2019 | Faraji-Dana .......... G01J 3/0259 |
| 2019/0235230 A1 | 8/2019 | Zemp et al. |
| 2019/0375988 A1 | 12/2019 | Yamamoto et al. |
| 2019/0383910 A1 | 12/2019 | Dunn et al. |
| 2019/0383916 A1 | 12/2019 | Gutnik et al. |
| 2020/0081099 A1 * | 3/2020 | Shaltout ............... G02B 5/1828 |
| 2020/0150324 A1 | 5/2020 | Tabirian et al. |
| 2020/0264343 A1 * | 8/2020 | Han .................. G02B 3/00 |
| 2020/0326462 A1 | 10/2020 | Yanai et al. |
| 2021/0396845 A1 | 12/2021 | Marx et al. |
| 2023/0023570 A1 | 1/2023 | Qin et al. |
| 2023/0089314 A1 | 3/2023 | Jennings et al. |

FOREIGN PATENT DOCUMENTS

| | | |
|---|---|---|
| KR | 20170015109 A | 2/2017 |
| WO | WO-2018054852 A1 | 3/2018 |

OTHER PUBLICATIONS

"U.S. Appl. No. 16/442,051, Non Final Office Action dated Jun. 24, 2022", 14 pgs.

"U.S. Appl. No. 16/442,051, Response filed Sep. 23, 2022 to Non Final Office Action dated Jun. 24, 2022", 7 pgs.

"U.S. Appl. No. 16/442,051, Advisory Action dated Dec. 30, 2022", 4 pgs.

"U.S. Appl. No. 16/442,051, Non Final Office Action dated Mar. 30, 2023", 13 pgs.

"U.S. Appl. No. 16/442,051, Response filed Jan. 4, 2023 to Advisory Action dated Dec. 30, 2022", 8 pgs.

"U.S. Appl. No. 16/442,051, Response filed Dec. 5, 2022 to Final Office Action dated Oct. 5, 2022", 8 pgs.

"U.S. Appl. No. 16/442,051, Final Office Action dated Jul. 27, 2023", 14 pgs.

"U.S. Appl. No. 16/442,051, Response filed Jun. 20, 2023 to Non Final Office Action dated Mar. 30, 2023", 8 pgs.

* cited by examiner

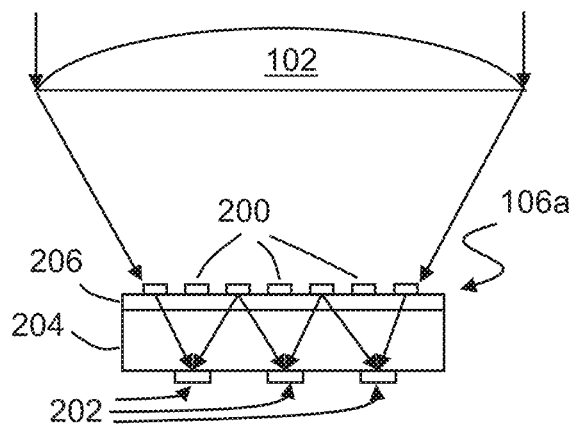 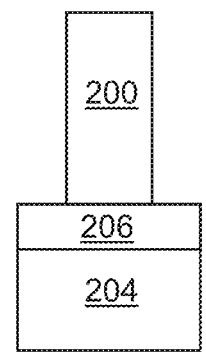
FIG. 2A  FIG. 2B
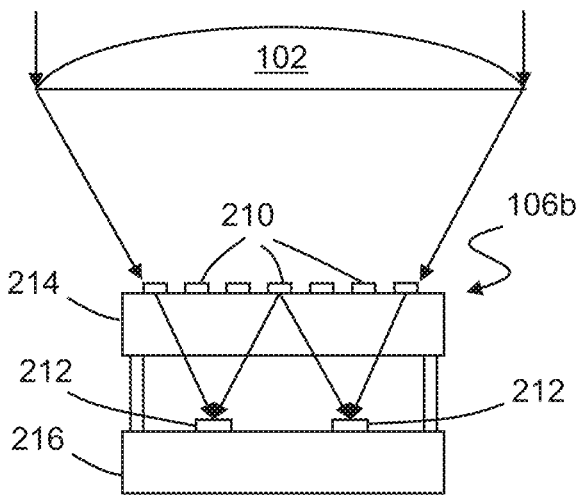 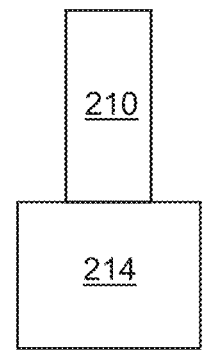
FIG. 2C  FIG. 2D

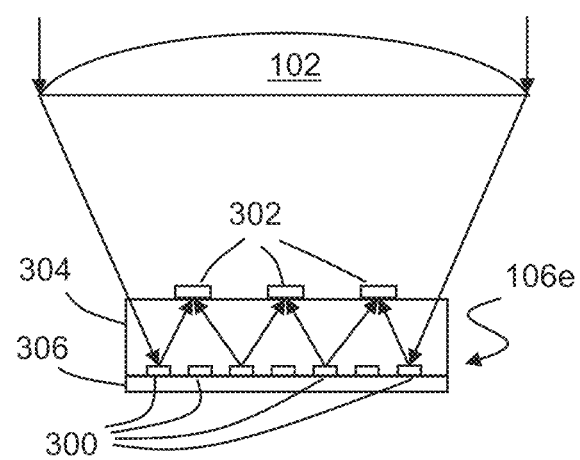 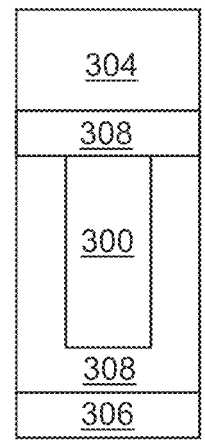
FIG. 3A  FIG. 3B
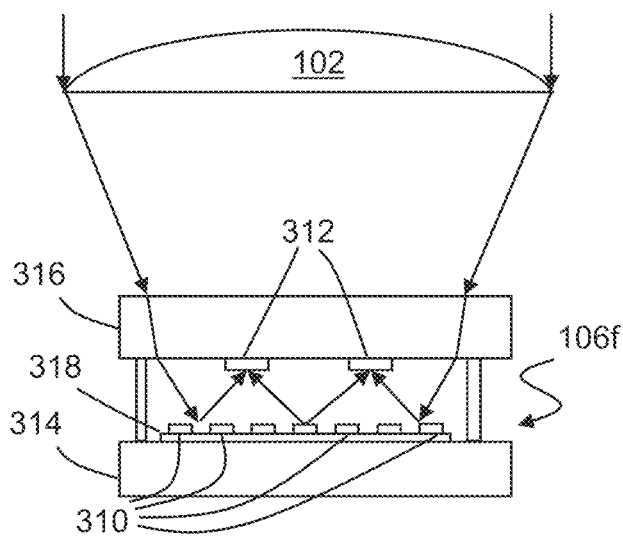 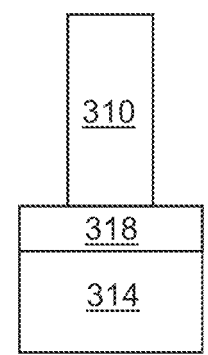
FIG. 3C  FIG. 3D

METASURFACE ARRAY FOR LIDAR SYSTEMS

TECHNICAL FIELD

This document pertains generally, but not by way of limitation, to lidar systems, and particularly but not by way of limitation to metasurfaces for lidar systems.

BACKGROUND

Lidar systems are used, for example, to determine a location of a target. Pulsed laser light can be used to illuminate the target of interest, and the lidar system can collect the reflected or scattered pulses, which are sensed by one or more sensor elements. The return time and wavelength of the sensed reflections can be measured by the lidar system to determine the location of the target.

SUMMARY

It is desirable to minimize the size of the components in a lidar system. The numerical aperture (NA) of a lens is a measure of its focusing and light collection ability. NA can be calculated using the equation $n*\sin(\theta)$, wherein n is the refractive index, and $\theta$ is a maximum half-angle that can enter or exit the lens, which is directly related to the diameter and focal length of the lens. For lidar systems, it is desirable to maximize the diameter of the lens to collect more light, thereby increasing the signal-to-noise ratio (SNR) due to the higher signal, and minimize the focal length to reduce the die size of the photodetector array, thereby increasing the SNR due to smaller detectors having lower noise. Thus, it is desirable to achieve the highest possible NA.

The present inventors have recognized, among other things, that the use of "metasurfaces" (sub-wavelength structures used to build planar lenses) can achieve a high NA with existing semiconductor processes and can be straightforwardly integrated with photodiode wafers. In one example, a receiver for use in detecting light pulses for a lidar system includes a photodiode array, a wafer, and a plurality of structures integrated on the wafer to form a metasurface lens. The metasurface lens is configured to focus the light pulses to the photodiode array and each of the plurality of structures includes at least one dimension that is less than a wavelength of the light pulses.

In another example, a method of collecting and detecting light pulses in a lidar system includes directing the light pulses received by the lidar system to a plurality of structures arranged in an array on a first wafer to form a metasurface lens; and focusing, by the metasurface lens, the light pulses to a photodiode array, wherein each of the plurality of structures includes at least one dimension that is less than a wavelength of the received light pulses.

In another example, a lidar system includes a metasurface lens and a plurality of photodiodes. The metasurface lens is configured to focus light pulses received by the lidar system and includes a wafer and a plurality of metasurface structures integrated on the wafer. Each of the plurality of metasurface structures include at least one dimension that is less than a wavelength of the light pulses. The plurality of photodiodes are positioned to sense the focused light from the metasurface lens.

Each of these non-limiting examples or aspects can stand on its own, or can be combined in various permutations or combinations with one or more other examples or aspects. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 2A-2E are cross-sectional diagrams illustrating transmissive metasurface lenses.

FIGS. 3A-3D are cross-sectional diagrams illustrating reflective metasurface lenses.

DETAILED DESCRIPTION

A lens system is disclosed herein that includes planar lenses formed of an array of metasurface structures. The metasurface structures have one or more dimensions that are smaller than the wavelength of a received electromagnetic signal (e.g., visible light, near-infrared, and others) and thus, are able to shape the phase, amplitude, and polarization of the received electromagnetic signal. For example, a height or diameter of each metasurface structure may be on the order of tens or hundreds of nanometers. The structures can be cylindrical, rectangular, or any other shape. The features of each structure, or a pitch between structures, can vary across the planar lens. For example, the features can be cylindrical posts of varying diameter, or rectangular pillars of varying dimension.

Generally available lidar lens systems include conventional (curved) lenses to focus and direct light onto photodiode arrays. These lenses can include both macroscale optical components as well as microlenses. With macroscale components, the achievable numerical aperture (NA) is generally limited by the curvatures achievable via molding/machining techniques and the refractive indices of available materials. High performance lenses are also quite bulky and expensive. Such systems may also include arrays of microlenses to further concentrate the received light. These microlenses can again be formed by molding, or alternatively, by using greyscale lithography or resist reflow processes to form a shape which is then etched into silicon, glass or other materials. Such arrays can be integrated directly on the wafer containing the photodiodes. As with macroscale lenses, however, the NA of these lenses tends to be limited by the available materials and/or the curvature achievable in the manufacturing process. By using arrays of metasurface structures to form metasurface lenses, the NA of the lens can be increased over conventional lenses and microlenses.

Figure 1:
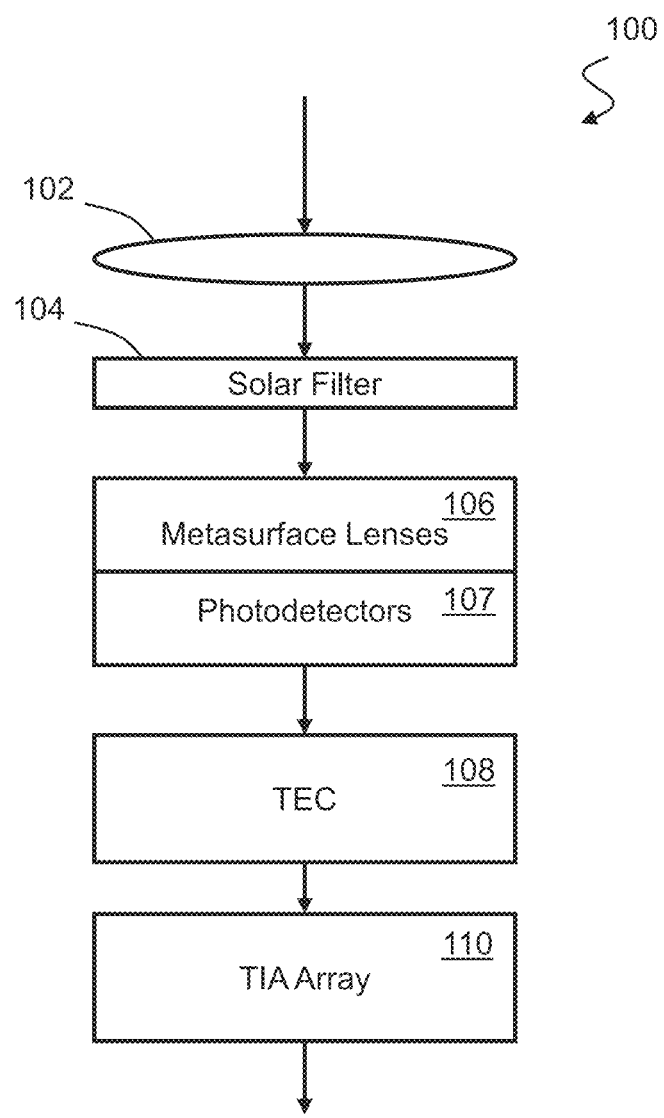
FIG. 1 is a diagram illustrating an example lidar system that includes metasurface lenses.

FIG. 1 is a block diagram illustrating an example lidar system 100 that includes metasurface lenses. The lidar system 100 includes optics 102, a solar filter 104, metasurface lenses 106, photodetectors 107, thermoelectric cooler (TEC) 108, and transimpedance amplifier (TIA) array 110. Other example lidar systems can include additional and/or alternative components as the lidar system 100. The optics 102 can be macroscale optics configured to receive and direct light. In some examples, the optics 102 can be eliminated and only planar metasurface lenses can be used to collect and focus light received by the lidar system 100.

The lidar system can include one or more attached light sources configured to emit an electromagnetic signal (e.g., visible light, short-wavelength infrared (SWIR), or other wavelength range) to illuminate a target. In another example, a light source separate from the lidar system can be used to illuminate the target of interest. A reflected or scattered electromagnetic signal can be received and focused by optics 102, for example, to the metasurface lenses 106 and photodetectors 107 through the solar filter 104. In an example, the photodetectors 107 can include germanium (Ge) photodetector arrays for detection of SWIR reflections, which are more cost effective than indium gallium arsenide (InGaAs) detectors, for example. To better serve long range lidar applications, it is desirable to capture more light and/or reduce detector noise in order to improve performance.

To capture more light while minimizing noise, it is desirable to include lenses with a maximal NA. To maximize the NA, the metasurface lenses 106 include sub-wavelength structures that form planar lenses to focus the received light from the optics 102 to one or more photodetectors through imparting phase shifts on the received signal. A sub-wavelength structure, for example, is a structure that has one or more dimensions shorter than a wavelength range of the electromagnetic signals the system uses for operation. In one example, the dimensions of the sub-wavelength structures are on the order of tens or hundreds of nanometers. The sub-wavelength structures can be used to create planar optics that can be positioned on the same die as the photodetectors, which can be arranged in an array of photodiodes, for example.

The TIA array 110 is used to convert the current received from the photodetectors 107 into voltage. The voltage can be provided to an analog-to-digital converter, for example, for conversion into a signal interpretable by a controller, processor, or other digital logic circuit. The voltages can be used by the controller or other circuit to analyze and extract information from the collected light, such as the location of a target, for example. The TEC 108 can be used to provide cooling for the lidar electronic components. The system 100 can include further components in addition to/in place of the components illustrated in FIG. 1.

Figure 2E:
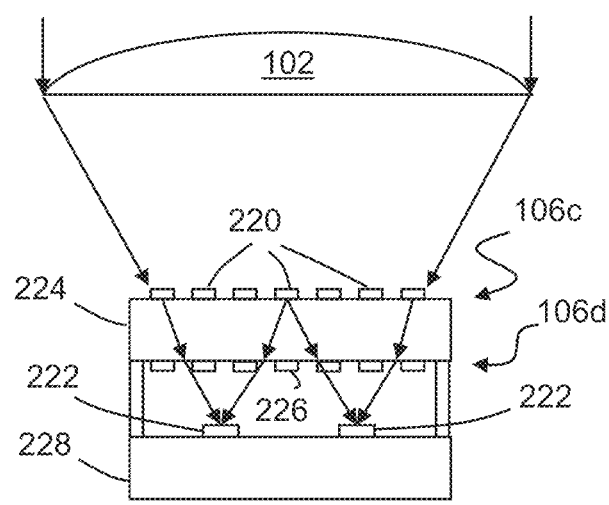

FIGS. 2A-2E are cross-sectional diagrams illustrating transmissive metasurface lenses 106a-106d. In FIG. 2A, metasurface lens 106a includes metasurface structures 200 and photodiodes 202 positioned on a common wafer 204. The structures 200 are positioned on a first side of the wafer nearer the optics 102, and the photodiodes 202 are positioned on a side opposite the structures 200. The metasurface structures 200 form a planar lens capable of focusing received light to the photodiodes 202 through the wafer 204.

The planar lens formed using the structures 200 is transmissive, focusing the received light through the wafer 204 to the photodiodes 202. In FIG. 2B, an example of a metasurface structure 200 is illustrated. In an example, the metasurface structure 200 and the wafer 204 are each made of silicon (Si), with a layer 206 between. The layer 206 can be made of silicon dioxide (SiO$_2$), for example. In other examples, the structure 200, the wafer 204, and the layer 206 can be made of any suitable transmissive materials.

In FIG. 2C, metasurface lens 106b includes metasurface structures 210 and photodiodes 212 positioned on two separate wafers 214 and 216, respectively. The structures 210 are positioned on a side of the wafer 214 nearer the optics 102, and the photodiodes 212 are positioned on a side of the wafer 216 nearer the optics 102. The metasurface structures 210 form a planar lens capable of focusing received light to the photodiodes 212 through the wafer 214. The two wafers 214 and 216 can be bonded together using any suitable technique.

The planar lens formed using the structures 210 is transmissive, focusing the received light through the structures 210 to the photodiodes 212. In FIG. 2D, an example of a metasurface structure 210 is illustrated. In an example, the metasurface structure 210 is made of silicon (Si) and the wafer 214 is made of silicon dioxide (SiO$_2$). In other examples, the structure 210 and the wafer 214 can be made of any suitable transmissive materials. While two example transmissive metasurface lenses are illustrated in FIGS. 2A-2D, other example transmissive lenses can include additional/alternative materials, and/or variation in positioning of the metasurface structures and photodiodes.

In FIG. 2E, two metasurface lenses 106c and 106d are formed on each side of a wafer 224. The lens 106c is formed of metasurface structures 220 and the lens 106d is formed of metasurface structures 226. The structures 220 are positioned on a side of the wafer 224 nearer the optics 102, and the structures 226 are positioned on a side of the wafer 224 opposite the structures 220. The photodiodes 222 are positioned on a side of the wafer 228 nearer the optics 102. The metasurface structures 220 and 226 form planar lenses capable of focusing received light to the photodiodes 222 through the wafer 224. The two wafers 224 and 228 can be bonded together using any suitable technique. The wafers 224 and 228, and the metasurface structures 220 and 226 can be formed of any of the materials discussed above.

FIGS. 3A-3D are cross-sectional diagrams illustrating reflective metasurface lenses 106e and 106f. In FIG. 3A, metasurface lens 106e includes metasurface structures 300 and photodiodes 302 positioned on a common wafer 304. The structures 300 are positioned on a first side of the wafer 304 away from the optics 102, and the photodiodes 302 are positioned on a side opposite the structures 300 and nearer the optics. The metasurface structures 300 form a planar lens capable of collecting, reflecting, and focusing the received light to the photodiodes 302 through the wafer 304.

The metasurface lens formed using structures 300 is reflective, collecting and reflecting the received light through the wafer 304 to the photodiodes 302. In FIG. 3B, an example of a metasurface structure 300 is illustrated. In an example, the metasurface structure 300 and the wafer 304 are each made of silicon (Si), with a silicon dioxide (SiO$_2$) layer 308 surrounding the structure 300. The structures 300 are positioned on an aluminum (Al) layer 306, for example, to aid in collection and reflection of the light. In other examples, the structure 300, the wafer 304, and the layer 308 are each made of any suitable transmissive material and the layer 306 is any suitable reflective material. While two example reflective metasurface lenses are illustrated in FIGS. 3A-3D, other example reflective lenses can include additional/alternative materials, and/or variation in positioning of the metasurface structures and photodiodes. Other examples can also include further metasurface lenses similar to the embodiment illustrated in FIG. 2E.

In FIG. 3C, metasurface lens 106f includes metasurface structures 310 and photodiodes 312 positioned on two separate wafers 314 and 316, respectively. The structures 310 are positioned on a side of the wafer 314 nearer the optics 102, and the photodiodes 212 are positioned on a side of the wafer 216 away from the optics 102. The metasurface structures 310 form a planar lens capable of collecting and reflecting light to the photodiodes 312 through the wafer 314. The two wafers 314 and 316 can be bonded together using any suitable technique.

The metasurface lens formed using the structures 310 is reflective, collecting, reflecting, and focusing the received light from the structures 310 to the photodiodes 312. In FIG. 3D, an example of a metasurface structure 310 is illustrated. In an example, the metasurface structure 310 is made of silicon dioxide ($SiO_2$) or silicon nitride (SiN) and the wafer 314 is made of silicon (Si). An aluminum (Al) layer 318 is positioned between the structure 310 and the wafer 314 to aid in collection and reflection of the received light.

Figure 4:
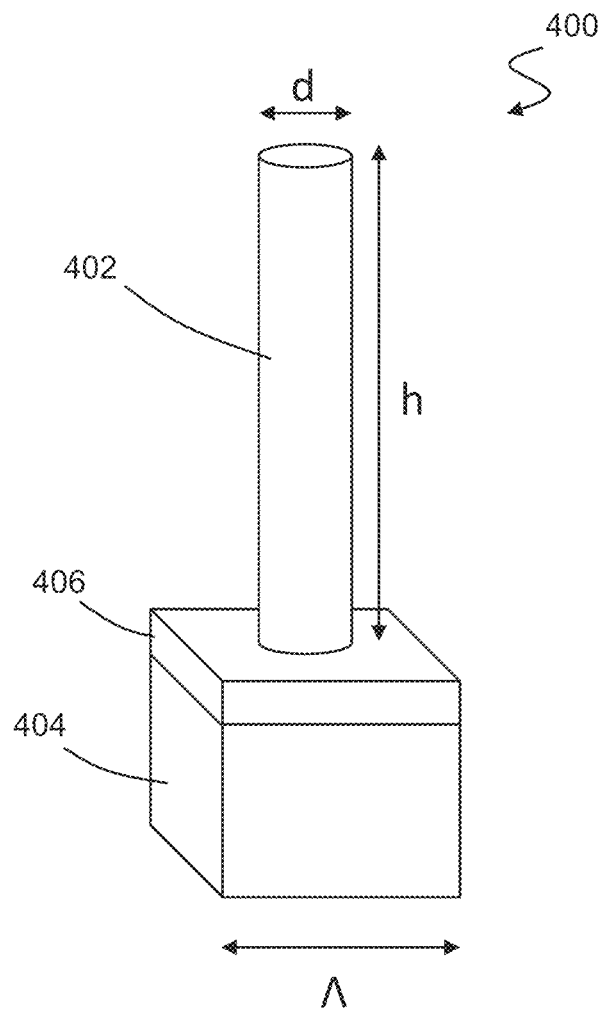
FIG. 4 is a perspective view illustrating a metasurface structure used in a metasurface lens.

FIG. 4 is a perspective view of an example metasurface structure 400. The metasurface structure 400 can be used in any of the metasurface lenses described herein. While illustrated as a cylindrical post, the structure 400 can be a rectangular pillar or any other three-dimensional structure. The example metasurface structure 400 has a pitch 'A', and includes a cylindrical post 402 having a diameter 'd' and a height 'h'. In an example, the pitch Λ can be on the order of hundreds of nanometers and the height h and diameter d can be on the order of tens or hundreds of nanometers. In other examples, the pitch Λ, height h, and diameter d can be any size permitted by the process technology.

The metasurface structure is integrated on a wafer 404. The metasurface structure 400 can be made of any suitable material including silicon, silicon dioxide, silicon nitride, or any other material. The wafer 404 can be silicon, glass, or any other substrate. If the metasurface lens that includes the metasurface structure is used as a reflective lens, then layer 406 can be a metallic layer, for example, configured to reflect received light pulses that are focused using metasurface structures 400.

The phase change of the light passing through the metasurface structure 400 will depend on the height 'h' of the post 402, the proportion of the area occupied by the pillar 402 of diameter 'd', and the refractive indices n1 (the refractive index of the material of the post 402) and n2 (the refractive index of the medium surrounding the post 402). The phase change will increase with increasing thickness of the pillar 402, and in the case that n1>n2, it will also increase with increasing diameter 'd'.

The effective refractive index of a metasurface lens can therefore be controlled, for example, by varying a dimension of a structure 400 across several adjacent structures. For the example illustrated in FIG. 4, the pitch Λ can be fixed for each metasurface structure 400. With the pitch Λ fixed, the diameter 'd' can be varied between each metasurface structure 400, varying the effective refractive index of each structure 400. In other examples, the pitch Λ can vary while keeping the diameter 'd' fixed. For increased performance, it may be desirable to have a high aspect ratio (i.e., a large height 'h' compared to the diameter 'd').

To focus the received light at a focal length of f, the phase φ at a given point must be:

$$\phi(x, y) = \frac{2\pi n}{\lambda_0}\left(\sqrt{x^2 + y^2 + f^2} - f\right) \quad [2]$$

where:
n is the refractive index of the material in which the light is being focused (e.g., the wafer 404), and
$\lambda_0$ is the free space wavelength of the light.

Using equations [1] and [2], metasurface structures 400 can be sized and positioned to focus received light to one or more respective photodiodes.

Figure 5:
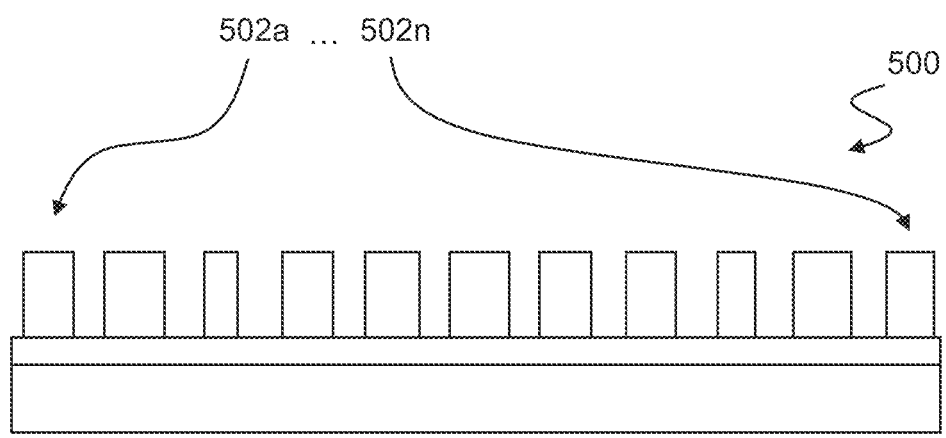
FIG. 5 is a cross-sectional view illustrating an example metasurface lens.

FIG. 5 is a cross-sectional view of a metasurface lens 500 that includes several metasurface structures 502a-502n. Each metasurface structure 502a-502n can be a cylindrical post such as that discussed with respect to FIG. 4. As seen in FIG. 5, the diameter of each metasurface structure 502a-502n varies, while the pitch remains constant. As discussed above the change in phase of the received light is based on the dimensions of each metasurface structure 502a-502n. In an example, the structures can generate 2c worth of phase change and then reset (i.e., a Fresnel lens). The metasurface lens 500 can be configured as a transmissive lens or a reflective lens depending the materials used to construct the lens 500.

Figures 6A, 6B:
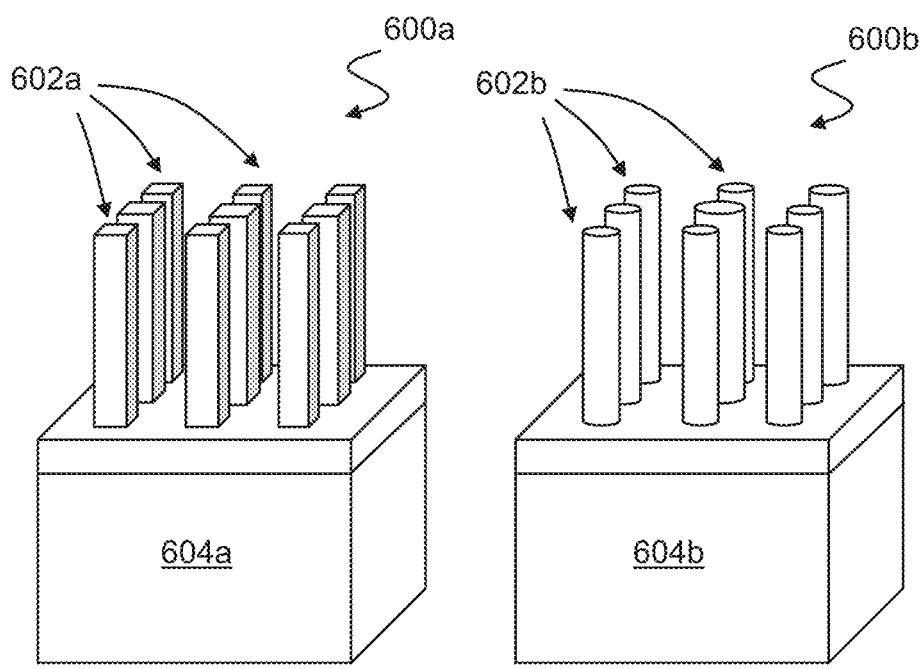
FIGS. 6A and 6B are perspective views illustrating example arrays of metasurface structures used to form metasurface lenses.

FIGS. 6A and 6B are perspective views illustrating example metasurface lenses 600a and 600b, respectively. Lens 600a includes rectangular pillars 602a integrated on a wafer 604a. In the example illustrated in FIG. 6A, the width of the pillars is varied between pillars to control the effective refractive index for the lens 600a. In other examples, the pitch between each pillar can be varied while keeping the widths of the pillars constant, or any other dimension of the pillars 602a can be varied so as to control the refractive index of the lens to focus the received light to one or more respective photodiodes.

Lens 600b includes cylindrical posts 602b integrated on a wafer 604b. In the example illustrated in FIG. 6B, the diameter of the posts is varied between posts to control the effective refractive index for the lens 600b. In other examples, the pitch between each post can be varied while keeping the diameters of the posts constant, or any other dimension of the posts 602b can be varied so as to control the effective refractive index of the lens to focus the received light to one or more respective photodiodes.

Directly integrating the structures 602a and 602b allows a substantially simplified system design. This allows critical optical alignments to be achieved with high precision on or between wafers, rather than between macroscale optical components in a larger mechanical assembly, where alignments are more difficult to maintain. Metasurface structures are also relatively inexpensive to produce, as compared to macroscale and microscale lenses. Thus, cost can be reduced while also reducing the size and complexity of the optical components of a lidar or other system.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A lidar system receiver, the receiver comprising:
   a photodiode array;
   a first wafer;
   a plurality of structures integrated on the first wafer to form a metasurface lens, wherein the metasurface lens is configured to focus light pulses received by the lidar system to the photodiode array, and wherein each of the plurality of structures includes at least one dimension that is less than a wavelength of the light pulses; and
   wherein the metasurface lens is reflective, the photodiode array is arranged at a first side of the first wafer and the plurality of structures are arranged at a second side of the first wafer opposite the first side, and wherein the plurality of structures are configured to receive the light pulses through the first wafer and reflect the light pulses back through the first wafer to the photodiode array.

2. The receiver of claim 1, wherein the photodiode array is integrated on the first wafer and the plurality of structures reflect the light pulses to focus the light pulses to the photodiode array.

3. The receiver of claim 1, wherein the plurality of structures of the metasurface lens are positioned on a metal reflective layer.

4. A method of operating a lidar system, the method comprising:
   receiving light pulses by a metasurface lens of the lidar system, wherein the metasurface lens includes a plurality of structures arranged in an array on a first wafer of the lidar system;
   focusing, by the metasurface lens, the light pulses to a photodiode array of the lidar system, wherein each of the plurality of structures includes at least one dimension that is less than a wavelength of the received light pulses;
   determining location of a target using the received detected light pulses; and
   wherein the metasurface lens is reflective, and the photodiode array is arranged at a first side of the first wafer and the plurality of structures are arranged at a second side of the first wafer opposite the first side, and wherein focusing, by the metasurface lens, the light pulses to the photodiode array includes the plurality of structures of the metasurface lens receiving the light pulses through the first wafer and reflecting the light pulses back through the first wafer to the photodiode array.

5. The method of claim 4, wherein focusing the light pulses to the photodiode array includes receiving the light pulses through the first wafer and reflecting the light pulses, by the metasurface lens, to focus the light pulses to a photodiode array integrated on the first wafer.

6. The method of claim 5, wherein the reflecting the light pulses includes reflecting, by the metasurface lens, light pulses received from optics positioned on the first side of the first wafer through the first wafer back through the first wafer to the photodiode array.

7. The method of claim 6, wherein the plurality of structures are arranged on a reflective layer that includes metal, and wherein focusing, by the metasurface lens, the light pulses to the photodiode array comprises receiving the light pulses through the second wafer and reflecting, by the metasurface lens and the reflective layer, the light pulses to the photodiode array.

8. A lidar system comprising:
   a metasurface lens configured to focus light pulses received by the lidar system, wherein the metasurface lens comprises a first wafer and a plurality of metasurface structures integrated on the first wafer, and wherein each of the plurality of metasurface structures include at least one dimension that is less than a wavelength of the light pulses; and
   a plurality of photodiodes, wherein the metasurface lens is reflective, the plurality of photodiodes are arranged at a first side of the first wafer and the plurality of structures are arranged at a second side of the first wafer opposite the first side, and wherein the plurality of structures are configured to receive the light pulses through the first wafer and reflect the light pulses back through the first wafer to the plurality of photodiodes.

9. The lidar system of claim 8, wherein the metasurface lens and the plurality of photodiodes are integrated on the first wafer.

10. The lidar system of claim 8, including optics, and wherein the plurality of photodiodes are arranged nearer to the optics than the metasurface lens.

11. The lidar system of claim 8, wherein the plurality of metasurface structures are cylindrical posts, and wherein a diameter of the cylindrical post is varied between each of the plurality of metasurface structures to control an effective refractive index of the metasurface lens.

12. The lidar system of claim 11, wherein the diameter of the cylindrical posts are varied such that the metasurface lens is a Fresnel lens.

13. The lidar system of claim 8, wherein the plurality of metasurface structures are rectangular pillars, and wherein a dimension the rectangular pillar is varied between each of the plurality of metasurface structures to control an effective refractive index of the metasurface lens.

\* \* \* \* \*